(12) United States Patent  (10) Patent No.: US 10,358,253 B2
Saiki et al.  (45) Date of Patent: Jul. 23, 2019

(54) PAPER CUP, PAPER CUP FOR ACIDIC FOOD

(71) Applicant: TOPPAN PRINTING CO., LTD., Tokyo (JP)

(72) Inventors: Akiko Saiki, Tokyo (JP); Kosuke Shimizu, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/156,211

(22) Filed: Oct. 10, 2018

(65) Prior Publication Data
US 2019/0039357 A1  Feb. 7, 2019

Related U.S. Application Data

(63) Continuation of application No. PCT/JP2017/015393, filed on Apr. 14, 2017.

(30) Foreign Application Priority Data

Apr. 14, 2016 (JP) .................... 2016-081201

(51) Int. Cl.
*B32B 1/02* (2006.01)
*B65D 3/06* (2006.01)
(Continued)

(52) U.S. Cl.
CPC .................. *B65D 3/06* (2013.01); *B32B 1/02* (2013.01); *B32B 5/02* (2013.01); *B32B 27/10* (2013.01); *B32B 29/00* (2013.01); *B65D 3/04* (2013.01); *B65D 3/10* (2013.01); *B65D 3/22* (2013.01); *B65D 65/40* (2013.01); *B32B 2262/04* (2013.01)

(58) Field of Classification Search
CPC .... B32B 1/02; B65D 3/04; B65D 3/06; B65D 65/40
See application file for complete search history.

(56) References Cited

U.S. PATENT DOCUMENTS 4,525,396 A 6/1985 Takasa et al.
2013/0004687 A1 1/2013 Oomori et al.

FOREIGN PATENT DOCUMENTS

JP 59-37139 2/1984
JP 3641690 4/2005
(Continued)

OTHER PUBLICATIONS

International Search Report dated May 16, 2017 in corresponding International Patent Application No. PCT/JP2017/015393.
(Continued)

*Primary Examiner* — Walter Aughenbaugh

(57) ABSTRACT

A paper cup includes barrier paper, the barrier paper including at least a paper base material, a reinforcing layer containing cellulose nanofibers which is formed on the paper base material, and a sealant layer formed on the reinforcing layer, in which after the paper cup is caused to free-fall 5 times towards a concrete floor surface from a height of 1 m with the bottom portion being disposed downward, the paper cup has a buckling strength of 350 N or more in a case of being sandwiched between two parallel plate surfaces and compressed in a height direction of the body portion, and has a lateral pressing strength of 4 N or more in a case where the body portion is pressed by 10 mm at a ⅔ height, from a bottom, of the entire height of the paper cup.

8 Claims, 1 Drawing Sheet

(51) Int. Cl.
    *B32B 27/10*     (2006.01)
    *B32B 29/00*     (2006.01)
    *B65D 3/22*     (2006.01)
    *B32B 5/02*     (2006.01)
    *B65D 3/04*     (2006.01)
    *B65D 3/10*     (2006.01)
    *B65D 65/40*     (2006.01)

(56) References Cited

FOREIGN PATENT DOCUMENTS

| | | |
|---|---|---|
| JP | 3873591 | 1/2007 |
| JP | 2009-263850 | 11/2009 |
| JP | 2015-24540 | 2/2015 |
| JP | 2015-229816 | 12/2015 |
| WO | WO 2011/118521 | 9/2011 |

OTHER PUBLICATIONS

Written Opinion of the International Searching Authority dated May 16, 2017 in corresponding International Patent Application No. PCT/JP2017/015393.

PAPER CUP, PAPER CUP FOR ACIDIC FOOD

CROSS REFERENCE TO RELATED APPLICATIONS

This application is a continuation application based on a PCT Patent Application No. PCT/JP2017/015393, filed Apr. 14, 2017, whose priority is claimed on Japanese Patent Application No. 2016-081201, filed on Apr. 14, 2016, the contents of which are hereby incorporated by reference.

BACKGROUND OF THE INVENTION

Field of the Invention

The present invention relates to a paper cup and a paper cup for acidic food which are excellent in protection of contents, allows easy transport and handling, and is suitable for filling foods or the like.

Description of Related Art

Paper cup containers are widely used as containers for foods such as beverages, soups, noodles, and yogurt. Due to growing interests in environmental issues in recent years, paper containers are used even in fields where plastic containers have been used so far.

In addition, from the viewpoint of resource saving, weight reduction, and cost reduction, there is a movement to decrease a basis weight of cup base paper used for a paper cup. In a case where the basis weight of cup base paper is decreased, problems may occur from the viewpoints of protection of contents and a handling property as follows. (1) Due to decreased buckling strength and decreased lateral pressing strength of a paper cup, in a case where the paper cup is fallen, the paper cup is deformed so that contents therein are leaked or damaged. (2) In a case of gripping a cup, due to deformation of a container, contents therein easily spill out. (3) Multiple stacking is not allowed at the time of transport or display.

As an approach of decreasing a basis weight of cup base paper without decreasing strength of a paper cup, for example, a method of imparting strength by double-winding or triple-winding an opening edge portion of a cup has been proposed (for example, Patent Document 1 (Japanese Patent No. 3873591)). However, this approach requires, in addition to usual cup molding steps, a processing step using a special top curl mold, which causes a cost increase.

On the other hand, in recent years, cellulose, which is a naturally derived environmentally-friendly biomass material, has attracted attention as a functional material. Cellulose is a main component of paper, and is contained in plant cell walls, extracorporeal secretions of microorganisms, mantles of sea squirts, and the like. Cellulose is a polysaccharide which is the most abundant on earth. In addition, cellulose has biodegradability, high crystallinity, and excellent stability and safety. Therefore, cellulose is expected to be applied and developed in various fields. Among cellulose, cellulose nanofibers obtained by mechanically fibrillating cellulose materials such as wood pulp and micronizing the resultant into a fibril shape or a microfibril shape are attracting particular attention. The cellulose nanofibers have features such as a high modulus of elasticity, a high strength, and a low coefficient of linear expansion. For this reason, studies have been extensively made to increase strength of materials by complexation of the cellulose nanofibers and a resin (see, for example, Patent Document 2 (Japanese Patent No. 3641690)).

In this connection, regarding complexation of the cellulose nanofibers and paper, examinations have been made to improve printing suitability of paper such as smoothness, an inking property, and a strike-through prevention effect by manufacturing paper including internally adding the cellulose nanofibers during paper making (see, for example, Patent Document 3 (Japanese Unexamined Patent Application, First Publication No. 2009-263850)).

However, in a method of adding the cellulose nanofibers during paper making, a yield of the cellulose nanofibers into an inside of the paper becomes a problem. In such a method, an effect due to complexation of a paper base material and a reinforcing layer containing the cellulose nanofibers may not be sufficiently obtained.

SUMMARY OF THE INVENTION

The present invention has been made in view of the above problems, and an object of the present invention is to provide a paper cup having an excellent mechanical strength while decreasing a basis weight of a paper base material.

In order to solve the above-mentioned problems, a paper cup according to a first aspect of the present invention includes barrier paper, the paper cup having a bottom portion and a body portion which are formed of the barrier paper, the barrier paper including at least a paper base material, a reinforcing layer containing cellulose nanofibers which is formed on the paper base material, and a sealant layer formed on the reinforcing layer, in which after the paper cup is caused to free-fall 5 times towards a concrete floor surface from a height of 1 m with the bottom portion being disposed downward, the paper cup has a buckling strength of 350 N or more in a case of being sandwiched between two parallel plate surfaces and compressed in a height direction of the body portion, and has a lateral pressing strength of 4 N or more in a case where the body portion is pressed by 10 mm at a ⅔ height, from a bottom, of the entire height of the paper cup.

The paper base material may have a basis weight of 300 $g/m^2$ or less.

A coating amount of the reinforcing layer may be 0.2 $g/m^2$ to 5.0 $g/m^2$ in terms of dry mass.

An amount of the cellulose nanofibers in the reinforcing layer may be 20% by mass or more.

The cellulose nanofibers may be obtained by fibrillating a natural cellulose material.

The cellulose nanofibers may have an average fiber diameter of 2 nm to 2,000 nm.

The reinforcing layer may further contain a water-soluble polymer.

A paper cup for acidic food according to a second aspect of the present invention is configured to have the paper cup according to the first aspect, in which the paper cup has an improved mechanical strength by accommodating liquid or semi-solid contents having a pH of 6 or less.

According to the above aspects of the present invention, by using barrier paper having a reinforcing layer containing cellulose nanofibers, it is possible to provide a paper cup having an excellent mechanical strength while decreasing a basis weight of a paper base material.

DETAILED DESCRIPTION OF THE INVENTION

Figure 1:
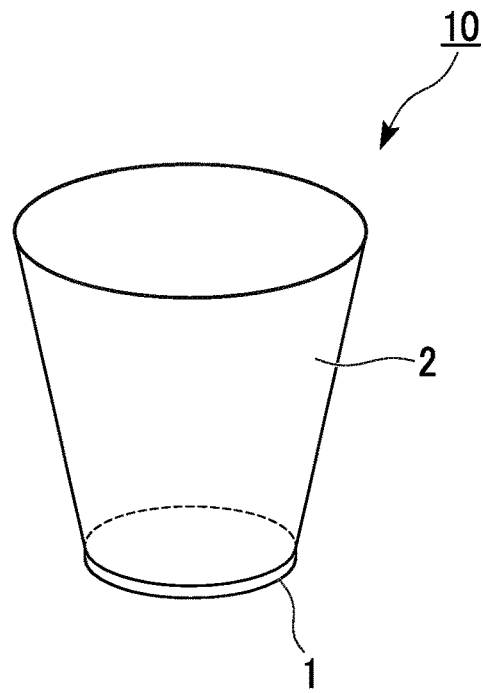
FIG. 1 is a perspective view schematically showing a paper cup according to one embodiment of the present invention.

Hereinafter, embodiments to which the present invention is applied will be described in detail with reference to the drawings. The drawings used in the following description are for showing configurations of the embodiments of the present invention, and sizes, thicknesses, dimensions, and the like of the respective parts shown in the drawings may be different from a dimensional relationship of an actual laminate.

Embodiment

"Paper Cup"

FIG. 1 is a perspective view schematically showing a paper cup according to a first embodiment of the present invention.

Figure 2:
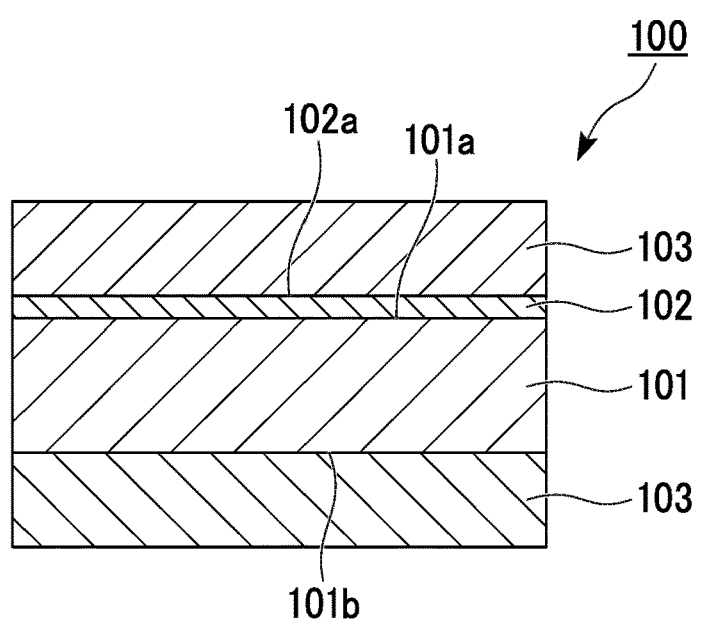
FIG. 2 is a cross-sectional view schematically showing barrier paper that constitutes the paper cup according to the embodiment of the present invention.

FIG. 2 is a cross-sectional view schematically showing barrier paper that constitutes the paper cup according to the first embodiment of the present invention.

As shown in FIG. 1, a paper cup 10 according to the present embodiment has a bottom portion 1 and a body portion 2.

The bottom portion 1 and the body portion 2 are formed of barrier paper 100 as shown in FIG. 2. As shown in FIG. 2, the barrier paper 100 has a paper base material 101, and a reinforcing layer 102 containing cellulose nanofibers which is formed on the paper base material 101, that is, on one surface (hereinafter referred to as a "first surface") 101a of the paper base material 101.

In addition, as shown in FIG. 2, the bather paper 100 has a sealant layer 103 formed on a surface (hereinafter referred to as "one surface (one surface of the reinforcing layer 102)") 102a of the reinforcing layer 102 which is on an opposite side to a surface thereof in contact with the paper base material 101, and a sealant layer 103 formed on a surface (hereinafter referred to as a "second surface (the other surface)") 101b of the paper base material 101 which is on an opposite side to a surface thereof in contact with the reinforcing layer 102.

The paper base material 101 is not particularly limited, and can be appropriately selected from printing paper and packaging paper depending on an application. Examples of the paper base material 101 include glassine paper, parchment paper, high-grade printing paper, intermediate-grade printing paper, low-grade printing paper, printing tissue paper, colored high-quality paper, art paper, coated paper, kraft paper, container board, coated cardboard, Ivory paper, card paper, and cup base paper.

The paper base material 101 preferably has a basis weight of 300 g/m² or less, and more preferably has a basis weight of 180 g/m² to 300 g/m².

In a case where the basis weight of the paper base material 101 is 300 g/m² or less, the paper cup 10 is excellent in buckling strength and lateral pressing strength as described later.

In general, strength of a paper cup is higher as a basis weight of a base paper (paper base material) to be used is larger in a case of having the same shape. The paper cup 10 according to the present embodiment is formed of the paper base material 101 having the reinforcing layer 102 containing cellulose nanofibers. Thus, even in a case of using the paper base material 101 having a smaller basis weight, the paper cup 10 has a high strength.

As the cellulose nanofibers constituting the reinforcing layer 102, natural cellulose is used. Examples of the natural cellulose include various wood pulp obtained from needle-leaved tree, broad-leaved tree, and the like, non-wood pulp obtained from kenaf, bagasse, straw, bamboo, cotton, seaweed, and the like, cellulose obtained from sea squirts, and cellulose produced by microorganisms.

The average fiber diameter (average fiber width) of the cellulose nanofibers is preferably 2 nm to 2,000 nm, and more preferably 4 nm to 200 nm.

In a case where the average fiber diameter of the cellulose nanofibers is 2 nm or more, crystallinity of the cellulose nanofibers is not decreased and the cellulose nanofibers has a high strength. In a case of the cellulose nanofibers having an average fiber diameter of less than 2 nm, crystallinity of cellulose microfibrils is decreased, and the cellulose nanofibers become a state which is close to a molecularly dispersed water-soluble polymer instead of a fiber-shaped state, so that an effect of improving strength cannot be obtained. In a case where the average fiber diameter of the cellulose nanofibers is 2,000 nm or less, the cellulose nanofibers can penetrate among fibers forming the paper base material 101. Therefore, adhesion between the cellulose nanofibers and the paper base material 101 is increased, and the paper cup 10 does not cause a defect of interlayer peeling such as peeling of the sealant layer 103 in a case where the paper cup 10 is opened after being sealed with a lid material.

In addition, an average fiber length of the cellulose nanofibers is preferably 100 nm to 10 μm. In a case of the cellulose nanofibers having an average fiber length of less than 100 nm, crystallinity is decreased during a chemical treatment or fibrillation treatment for a cellulose nanofiber precursor, and an effect of improving strength is low. On the other hand, in a case of the cellulose nanofibers having an average fiber length of greater than 10 μm, due to a very high viscosity of a dispersion liquid, coating becomes difficult, which is not preferable.

As a method of measuring the fiber diameter of the cellulose nanofibers, a method in which a device such as an atomic force microscope (AFM) or a scanning electron microscope (SEM) is used to observe shapes of any large number of cellulose nanofibers and to measure fiber diameters thereof, and the measured values are averaged, or a method in which a device such as a particle size distribution meter is used to perform measurement from results of particle diameter measurement for a coating liquid containing cellulose nanofibers is used.

As the cellulose nanofibers, cellulose nanofibers manufactured by the following method can be used.

The cellulose nanofibers are microfibrils or microfibril aggregates of cellulose or derivatives of cellulose. Such cellulose nanofibers can be manufactured by a known manufacturing method.

Examples of a method of manufacturing the cellulose nanofibers include a method in which a cellulose nanofiber precursor is subjected to a fibrillation treatment in a dispersion medium (for example, water) to prepare a nanofiber dispersion liquid. Here, the cellulose nanofiber precursor is a kind of cellulose which is not subjected to a fibrillation treatment, and is composed of aggregates of microfibrils.

Examples of the cellulose nanofiber precursor include a cellulose raw material, oxidized cellulose obtained by oxidizing a cellulose raw material, and carboxymethyl cellulose obtained by carboxymethylating a cellulose raw material.

The cellulose raw material is not particularly limited as long as the cellulose raw material is a material containing cellulose, and naturally derived cellulose can be used. Examples of the naturally derived cellulose include various wood pulp, non-wood pulp, bacterial cellulose, waste paper pulp, cotton, valonia cellulose, and sea squirts cellulose.

In addition, as the cellulose nanofiber precursor, various commercially available cellulose materials and microcrystalline cellulose powders can also be used.

As a method of oxidizing the cellulose raw material to obtain oxidized cellulose, it is possible to make an appropriate selection from generally known methods in which oxidation is performed by causing a hydroxyl group to be changed to a carboxyl group via an aldehyde group. Among these methods, an oxidation treatment (hereinafter referred to as "TEMPO oxidation treatment") using, as a catalyst, an N-oxyl compound such as 2,2,6,6-tetramethyl-1-piperidine-N-oxy radical (hereinafter referred to as "TEMPO") is suitable. In a case of performing the TEMPO oxidation treatment, only an alcoholic primary carbon at a C6 position can be selectively oxidized out of three carbons having a hydroxyl group in a cellulose molecule on a crystal surface. Consequently, it is possible to cause a hydroxyl group in cellulose to be substituted with a carboxyl group via an aldehyde group. According to this oxidation treatment, carboxyl groups can be uniformly and efficiently introduced into cellulose depending on a degree of the TEMPO oxidation treatment. In addition, the TEMPO oxidation treatment hardly impairs crystallinity of cellulose as compared with other oxidation treatments. Therefore, microfibrils of oxidized cellulose obtained by the TEMPO oxidation treatment retain a high crystal structure (type I crystal structure) possessed by natural cellulose and have an excellent mechanical strength.

An amount of carboxyl groups to be introduced into cellulose (molar amount of carboxyl groups contained in 1 g of cellulose nanofibers) is preferably 0.1 mmol/g to 3.5 mmol/g, more preferably 0.5 mmol/g to 2.5 mmol/g, and even more preferably 1.0 mmol/g to 2.0 mmol/g.

In a case where the amount of carboxyl groups is 0.1 mmol/g or more, it becomes easy to form nanofibers during a fibrillation treatment of a cellulose nanofiber precursor, and a uniform cellulose nanofiber dispersion liquid is obtained. In a case where the amount of carboxyl groups is 3.5 mmol/g or less, a water resistance and a heat resistance of the reinforcing layer 102 formed using cellulose nanofibers are improved.

The amount of carboxyl groups in cellulose nanofibers can be controlled by reaction conditions (temperature, time, reagent amount) at the time of oxidation.

As a treatment method in which a cellulose raw material is carboxymethylated to obtain carboxymethyl cellulose, it is possible to use a method in which a cellulose raw material is treated with monochloroacetic acid or sodium monochloroacetate to etherify hydroxyl groups in cellulose and introduce carboxymethyl groups into cellulose.

As an introduction amount of the carboxymethyl groups with respect to cellulose, a degree of substitution is preferably 0.5 or less. In a case where the degree of substitution is 0.5 or less, solubility of cellulose is not increased and a fiber shape can be maintained. Therefore, a reinforcing effect of the cellulose nanofibers can be maintained.

The degree of substitution of carboxymethyl groups in cellulose is a proportion of hydroxyl groups in the cellulose which are substituted by the carboxymethyl groups and is defined by (number of carboxymethyl groups after substitution)/(number of hydroxyl groups before substitution).

The fibrillation treatment of the cellulose nanofiber precursor is not particularly limited, and it is possible to use a mechanical treatment using an ultrasonic homogenizer, a low-pressure homogenizer, a high-pressure homogenizer, a counter collision type homogenizer, an ultra-high-pressure homogenizer, a ball mill, a planetary mill, a high-speed rotation mixer, grinder milling, or the like.

For the cellulose nanofibers, cellulose nanofibers having different chemical structures, fiber diameters, and fiber lengths which are manufactured by various methods may be mixed and used. For example, nanofibers obtained by fibrillating a cellulose nanofiber precursor which has not been subjected to a chemical treatment and TEMPO-oxidized cellulose nanofibers may be mixed and used. For example, cellulose nanofibers of short fibers are easily caused to have a low viscosity and are suitable for coating. However, such cellulose nanofibers easily penetrate among fibers of the paper base material 101, which makes it difficult to form the reinforcing layer 102. Therefore, by mixing cellulose nanofibers of short fibers and cellulose nanofibers of long fibers, it is possible to achieve both coating property and film-forming property.

A coating amount of the reinforcing layer 102 is preferably 0.2 g/m$^2$ to 5.0 g/m$^2$, and more preferably 0.5 g/m$^2$ to 3.0 g/m$^2$ in terms of dry mass.

In a case where the coating amount of the reinforcing layer 102 is 0.2 g/m$^2$ or more in terms of dry mass, strength of the reinforcing layer 102 can be improved. In a case where the coating amount of the reinforcing layer 102 is 5.0 g/m$^2$ or less in terms of dry mass, material costs are not increased, and a drying load during formation of the reinforcing layer 102 is not increased, which is advantageous from the viewpoint of manufacture.

Whether or not entanglement of the cellulose nanofibers is dense can be determined, for example, by observing a surface using a scanning electron microscope (SEM, trade name: S-4800, manufactured by Hitachi High-Technologies Corporation) and measuring a specific gravity of a cast film.

The specific gravity of a cast film can be measured using a digital specific gravity meter (trade name: AND-DMA-220, manufactured by Ando Instrument Co., Ltd.). The cast film can be produced by pouring a predetermined amount of a water dispersion liquid of cellulose nanofibers into a polystyrene square case and performing heating and drying at 50° C. for 24 hours.

According to observation of a surface of the reinforcing layer 102 containing the cellulose nanofibers, as gaps generated between the fibers are smaller in terms of number and size, gaps between the cellulose nanofibers become small, and entanglement of the cellulose nanofibers becomes dense. In addition, according to measurement of a specific gravity of a cast film, as the case film has a higher specific gravity, gaps between the cellulose nanofibers become small, and entanglement of the cellulose nanofibers becomes dense. Accordingly, by further decreasing the gaps of the cellulose nanofibers, it is possible to prevent deterioration factors such as water vapor and dirt from infiltrating/penetrating into the reinforcing layer 102, and to prevent a gas barrier property of the reinforcing layer 102 from being decreased due to bending or the like.

Therefore, in the barrier paper 100, it is preferable that a water-soluble polymer having a good compatibility with cellulose be contained in the reinforcing layer 102 as a material capable of filling gaps existing among the cellulose nanofibers contained in the reinforcing layer 102. The reinforcing layer 102 containing the cellulose nanofibers and the water-soluble polymer prevents deterioration factors such as water vapor and dirt from infiltrating/penetrating, and as a result, a decrease in gas barrier property due to bending or the like becomes small.

As the water-soluble polymer, for example, polyvinyl alcohol (PVA), an ethylene-vinyl alcohol copolymer, carboxymethyl cellulose (CMC), polyacrylic acid, polyacrylamide, polyethylene imine, polyethylene oxide, starch, pectin, alginic acid, and the like are used. Among these, polyvinyl alcohol (PVA) or carboxymethyl cellulose (CMC) is preferable front the viewpoint of affinity with cellulose nanofibers and ease of availability. A degree of polymerization and an amount of functional groups of polyvinyl alcohol (PVA) or carboxymethyl cellulose (CMC) are not particularly limited and may be appropriately selected depending on an application.

These water-soluble polymers are excellent in film-forming property, transparency, flexibility, and the like, and have a good compatibility with cellulose fibers. Thus, it is possible to easily fill gaps of the cellulose fibers and to form the reinforcing layer 102 which has both strength and adhesion. In addition, polyvinyl alcohol (PVA) is a compound obtained by saponifying polyvinyl acetate, and includes from a so-called partially saponified PVA in which 10% to 20% of acetic acid groups remain, to a fully saponified PVA in which only 1% to 2% of acetic acid groups remain.

By mixing the cellulose nanofibers and the water-soluble polymer, a part of the water-soluble polymer which is molecularly dispersed in water and the cellulose nanofibers form the reinforcing layer 102 on the paper base material 101 without a gap. Therefore, interaction between the cellulose nanofibers and the paper base material 101 is increased, and adhesion therebetween is improved.

In a case of using the water-soluble polymer, a mass ratio ((A)/(B)) between the cellulose nanofibers (A) and the water-soluble polymer (B) is preferably 20/80 to 99/1.

In a case where the mass ratio of the water-soluble polymer (B) is 1 or more, it is possible to fill gaps in the cellulose nanofibers with the water-soluble polymer (B). On the other hand, in a case where the mass ratio of the water-soluble polymer (B) is 80 or less, it is possible to improve adhesion of the reinforcing layer 102 to the paper base material 101 and to prevent a film-forming property of the reinforcing layer 102 from being decreased due to too much soaking of a coating liquid.

In FIG. 2, a case where the reinforcing layer 102 is formed on the first surface 101a of the paper base material 101 is exemplified. However, the present embodiment is not limited thereto. In the present embodiment, the reinforcing layer 102 may be formed on both surfaces of the paper base material 101. In addition, the reinforcing layer 102 can exert a gas barrier property similarly on both surface of a content side (inner surface side) and an outer side (outer surface side) of the paper cup 10.

The sealant layer 103 functions as retaining a shape in a case where the barrier paper 100 is molded into a container such as the paper cup 10 and imparting a sealing property to prevent contents from leaking from the container. In addition, by forming the sealant layer 103, it is possible to impart, to the barrier paper 100, an anti-soiling property and a liquid resistance to a liquid having a high penetrating property. The sealant layer 103 may be formed on the entire surface or a part of the paper base material 101 as necessary.

In addition, as necessary, a printed layer may be formed between the paper base material 101 and the sealant layer 103.

A resin constituting the sealant layer 103 is not particularly limited, and a heat-sealable resin is used. Such a resin can be, for example, selected from a polyethylene-based resin such as a low density polyethylene resin (LDPE), a medium density polyethylene resin (MDPE), a high density polyethylene resin (HDPE), and a linear low density polyethylene (LLDPE), and a polypropylene-based resin such as a polypropylene resin, a propylene-ethylene random copolymer, and a propylene-ethylene block copolymer. Among this, a linear low density polyethylene (LLDPE) is preferable from the viewpoints of workability, processing suitability, economic efficiency and the like.

The paper cup 10 according to the present embodiment is formed of the barrier paper 100 having the reinforcing layer 102 containing cellulose nanofibers. Thus, as compared with a paper cup formed of an ordinary laminate having sealant layer/paper base material/sealant layer, the paper cup 10 has an increased strength against an external force (force applied to a paper cup from an outside).

After the paper cup 10 according to the present embodiment is caused to free-fall 5 times towards a concrete floor surface from a height of 1 m with a bottom portion being downward (with a bottom portion of the paper cup 10 being disposed downward), the paper cup 10 has a buckling strength of 350 N or more in a case of being sandwiched between two parallel plate surfaces and compressed in a height direction of the body portion 2, and has a lateral pressing strength of 4 N or more in a case where the body portion 2 is pressed by 10 mm at a ⅔ height, from the bottom, of the entire height of the paper cup 10.

The strength of the paper cup 10 against an external force can be quantitatively evaluated by measuring a buckling strength and a lateral pressing strength after a falling test. In ordinary paper cups, a minute distortion or deformation occurs due to an impact upon and after the falling test, and the buckling strength and the lateral pressing strength are decreased. In this connection, since the paper cup 10 according to the present embodiment is formed of the barrier paper 100 having the barrier layer 102 containing cellulose nanofibers, rigidity is increased, and high buckling strength and lateral pressing strength are retained.

The buckling strength of the paper cup 10 is strength measured in a case where the paper cup 10 is sandwiched between two parallel plate surfaces with an opening portion of the paper cup 10 facing upward, and compressed in a perpendicular direction (height direction of the body portion 2). For measurement of the buckling strength, a commercially available compression tester is used.

The lateral pressing strength of the paper cup 10 is strength (a repulsive force) measured in a case where a side surface of the body portion 2 of the paper cup 10 is pressed in a direction perpendicular to the height direction of the body portion 2 using a commercially available push-pull gauge or force gauge. In consideration of an influence of a bonded portion (an overlapping portion of the barrier paper 100, that is, an overlapping portion between a first end of the barrier paper 100 and a second end of the barrier paper 100 in a case where the barrier paper 100 is wound in a circle so as to form the body portion 2 of the paper cup 10) in the body portion 2 of the paper cup 10, a site at which the lateral pressing strength is measured is a surface 180° opposite to the bonded portion in the body portion 2.

For the paper cup 10 according to the present embodiment, in particular, in a case of using the barrier paper 100 having the reinforcing layer 102 containing cellulose nanofibers into which a carboxyl group or a carboxymethyl group has been introduced, an effect of improving strength is further increased in a case of being filled with acidic contents. This is considered to be due to contribution of the carboxyl group in the cellulose nanofibers.

In a case where cellulose into which a carboxyl group or carboxymethyl group has been introduced is made into nanofibers, the carboxyl group in a cellulose molecule is generally in a salt form (COONa form) having a metal ion such as sodium as a counter ion. In a case where the carboxyl group is in an acid form (COOH form), a large energy is required for fibrillation/dispersion, and it is not easy to perform micronization up to a fiber diameter suitable for the present embodiment. This is because by causing the carboxyl group to be in a salt form, an electrostatic repulsive force acts between the cellulose nanofibers, and the cellulose nanofibers are readily dispersed. In a case where a coating liquid containing cellulose nanofibers is coated and dried on the paper base material 1 in a state where the carboxyl group is in a salt form, the cellulose nanofibers of the paper cup 10 after molding are also in a salt form. In a case where the paper cup 10 is filled with acidic contents, the carboxyl group in the cellulose nanofibers becomes an acid form due to an acid penetrating from an end face of paper which is acidic, repulsion between the cellulose nanofibers is weakened, and coherence of the reinforcing layer 102 containing the cellulose nanofibers occurs, so that the paper cup 10 becomes harder. Here, the acid contents refer to liquid or semi-solid contents having a pH of 6 or less, and examples thereof include a dairy product, a lactic acid bacteria beverage, a fermented milk, and a dressing. A pH of the acidic contents is a value measured at 25° C. In other words, the paper cup 10 according to the present embodiment has an improved mechanical strength by accommodating liquid or semi-solid contents having a pH of 6 or less.

In accordance with the paper cup 10 according to the present embodiment, the following effects can be obtained. That is, since the barrier paper 100 having the reinforcing layer 102 containing cellulose nanofibers is used, it is possible to provide the paper cup 10 having an excellent mechanical strength while decreasing a basis weight of the paper base material 101. In addition, in a case where the cellulose nanofibers constituting the reinforcing layer 102 are cellulose nanofibers into which a carboxyl group or carboxymethyl group in a salt form has been introduced, it is possible to provide the paper cup 10 having an excellent mechanical strength in a case of being filled with acidic contents.

In the Examples to be described later, a paper cup with a capacity of 250 mL having a shape as shown in FIG. 1 is an exemplary example. However, the paper cup according to the present embodiment may have any capacity, size, and shape which are generally used as a paper cup, and is not limited to the Examples as described later.

"Method of Manufacturing Paper Cup"

With reference to FIGS. 1 and 2, a method of manufacturing the paper cup 10 in the present embodiment will be described.

Firstly, the cellulose fibers are micronized (fibrillated) (a cellulose fiber micronizing step).

A method of micronizing the cellulose fibers is not particularly limited, and, for example, mechanical treatment using a dispersing device such as a high-pressure homogenizer, an ultrasonic homogenizer, grinder milling, freeze pulverization, and media mill is mentioned.

In addition, as a step before carrying out the mechanical treatment, the cellulose fibers may be subjected to the above-mentioned chemical treatment. By controlling the degree of treatment for the mechanical treatment and the chemical treatment in a predetermined manner, it is possible to obtain cellulose nanofibers having a desired fiber shape and particle diameter.

In addition, the above-mentioned chemical treatment of the cellulose fibers may be carried out together with the micronization treatment of the cellulose fibers.

At this time, a compound used for the above-mentioned chemical treatment is added to a dispersion liquid of the cellulose fibers, and the micronization treatment and the chemical treatment of the cellulose fibers are carried out using the dispersion liquid.

Next, cellulose nanofibers or a dispersion liquid containing the cellulose nanofibers, obtained in the cellulose fiber micronizing step, are used to prepare a coating liquid containing the cellulose nanofibers (a coating liquid preparing step).

In a case of using the cellulose nanofibers obtained in the cellulose fiber micronizing step, the cellulose nanofibers are previously dispersed in water to prepare a dispersion liquid containing the cellulose nanofibers.

In this coating liquid preparing step, it is preferable to prepare a coating liquid by mixing the dispersion liquid containing the cellulose nanofibers and an aqueous solution containing the above-mentioned water-soluble polymer.

In a case of mixing the dispersion liquid containing the cellulose nanofibers and the aqueous solution containing a water-soluble polymer, a mass ratio ((A)/(B)) between the cellulose nanofibers (A) and the water-soluble polymer (B) is preferably 20/80 to 99/1.

Next, the coating liquid obtained in the above-described coating liquid preparing step is applied on the first surface 101a of the paper base material 101, and a coating film formed of the coating liquid is formed on the first surface 101a of the paper base material 101 (a coating film forming step).

A coating film (reinforcing layer 102) containing the cellulose nanofibers is preferably formed on the paper base material 101 by a coating method after paper making, in order to also increase a yield of the cellulose nanofibers into a product.

Increased strength of the reinforcing layer 102 due to the cellulose nanofibers is attributed to a high crystallinity and a strong bonding between the nanofibers caused by hydrogen bonding. By forming the reinforcing layer 102 containing highly strong cellulose nanofibers, a rigidity of the barrier paper 100 is increased. Thus, it is possible to impart a high strength to the barrier paper 100 even in a case where a basis weight of the paper base material 101 is decreased. In a case where the cellulose nanofibers are mixed in an inside of the paper base material by an approach such as internal addition, the cellulose nanofibers exist so as to be dispersed among coarse paper fibers. Therefore, it is not possible to form dense bonds among the fibers, and the effect of increasing strength of the paper base material is small.

A method of applying the coating liquid on the first surface 101a of the paper base material 101 is not particularly limited, and a known coating method can be used. Examples of the coating method include a coating method using a gravure coater, a dip coater, a reverse coater, a spin coater, a wire bar coater, a die coater, a spray coater, offset printing, letterpress printing, gravure printing, or the like.

By using a wet film forming method, a coating film (reinforcing layer 102) can be uniformly formed on the first surface 101a of the paper base material 101.

A solvent for the coating liquid is not particularly limited, and any solvent in which the cellulose nanofibers are dispersed well with a good dispersibility may be used. For example, it is possible to use one type or two or more types of various liquids such as water and alcohol.

In addition, the coating liquid can also be, as necessary, blended with various additives such as a surfactant, an antifoaming agent, and a dispersing agent which are intended to improve a coating property, and a crosslinking agent which is intended to improve a film quality, to the extent that an effect of the present embodiment is not impaired.

Next, the coating film obtained in the above-described coating liquid preparing step is dried to form the reinforcing layer 102 (reinforcing layer forming step).

As a method of drying the coating film coated on the first surface 101a of the paper base material 101, natural drying, blow drying, hot air drying, UV drying, hot roll drying, infrared irradiation, and the like are mentioned.

A drying temperature is preferably 100° C. to 180° C. In a case where the drying temperature is 100° C. or higher, crosslinking points between the cellulose fibers, or between the cellulose fibers and the first surface 101a of the paper base material 101 are increased, and strength of the reinforcing layer 102, and adhesion between the cellulose fibers, or between the cellulose fibers and the first surface 101a of the paper base material 101 are improved. In addition, due to release of moisture in the coating film, a hydrogen bonding between cellulose is increased, the cohesiveness of the reinforcing layer 102 is increased, and the improved bending resistance is exhibited. On the other hand, in a case where the drying temperature is 180° C. or lower, the reinforcing layer 102 can be prevented from being deteriorated due to heat and discolored.

Next, sealant layers 103 and 103 are formed on one surface 102a of the reinforcing layer 102 and the second surface 101b of the paper base material 101 (a sealant layer forming step).

The sealant layer 103 can usually be formed by a method of manufacturing a packaging material. Examples of such a method include a wet lamination method, a dry lamination method, a solventless lamination method, a thermal lamination method, and a melt extrusion lamination method.

In a case of forming the sealant layer 103 on the reinforcing layer 102, in order to improve adhesion, the reinforcing layer 102 may be previously subjected to a known surface treatment such as a corona treatment, an ozone treatment, a plasma treatment, a glow discharge treatment, and an oxidation treatment using chemical agents. Alternatively, a primer coat layer, an anchor coat layer, an adhesive layer, or the like may be formed in a predetermined manner between the reinforcing layer 102 and the sealant layer 103.

In addition, in a case where the sealant layer 103 is formed on the second surface 101b of the paper base material 101, in order to improve adhesion, a primer coat layer, an anchor coat layer, an adhesive layer, or the like may be formed. For the anchor coat layer and the adhesive layer, an imine-based adhesive, a butadiene-based adhesive, a urethane-based adhesive, or the like can be used depending on a method of forming the sealant layer.

In addition, in a case where a printed layer is formed on the second surface 101b of the paper base material 101, after the printed layer is formed on the paper base material 101, the anchor coat layer is formed, and then the sealant layer 103 is formed.

Through the above steps, the barrier paper 100 having the paper base material 101, the reinforcing layer 102 containing cellulose fibers which is formed on the first surface 101a of the paper base material 101, and the sealant layers 103 and 103 which are formed on the first surface 102a of the reinforcing layer 102 and on the second surface 101b of the paper base material 101, respectively.

Next, from the barrier paper 100, a body portion material and a bottom portion material are punched out by a punching die.

Next, the body portion material and the bottom portion material are molded by a known cup molding machine to obtain the paper cup 10 (a paper cup molding step).

Here, it is not necessary that all of the body portion material and the bottom portion material be the bather paper 100 in the present embodiment, and a different sheet material may be used as necessary.

In accordance with a method of manufacturing the barrier paper according to the present embodiment, due to use of the barrier paper 100 having the reinforcing layer 102 containing cellulose nanofibers, it is possible to provide the paper cup 10 having excellent mechanical strength.

It should be noted that the present invention is not limited to the above-described embodiments, and various modifications can be made without departing from the present invention. In addition, specific configurations, materials, and the like of the respective parts are not limited to those exemplary examples in the above-mentioned embodiments, and can be appropriately changed.

EXAMPLES

Hereinafter, the present invention will be described more specifically with reference to Examples. However, the present invention is not limited to the following Examples.

Manufacturing Example 1

Water was added to 18 g of needle-leaved tree kraft pulp to make 1800 g, and the resultant was treated for 30 seconds with a rotary blade type mixer so that the needle-leaved tree kraft pulp was coarsely dispersed in water.

The needle-leaved tree kraft pulp was left to stand for 3 days in a state of being dispersed in water, and the needle-leaved tree kraft pulp was sufficiently swollen.

The swollen needle-leaved tree kraft pulp was treated 8 times with a grinding stone E-#46 and 6 times with G-#80 using a millstone-type attritor (trade name: Supermasscolloider MKCA 6-2, manufactured by MASUKO SANGYO CO., LTD.), to obtain a dispersion liquid of white creamy cellulose nanofibers.

Manufacturing Example 2

30 g of needle-leaved tree kraft pulp was immersed in 600 g of water, and treated with a rotary blade type mixer for 30 seconds so that the needle-leaved tree kraft pulp was coarsely dispersed in water.

To the dispersed pulp slurry, 0.3 g of TEMPO which had been previously dissolved in 200 g of water, and 3 g of NaBr were added, and further diluted with water to make a total 1,400 mL.

An interior of a system was kept at 20° C., and an aqueous solution of sodium hypochlorite was added dropwise to the diluted solution of pulp slurry so as to be 10 mmol with respect to 1 g of cellulose.

Although a pH of the diluted solution began to be decreased from the start of the dropwise addition, a 0.5 N aqueous solution of sodium hydroxide was added dropwise at any time to keep the pH of the diluted solution at 10.

After 4 hours, in a case where the amount added dropwise of the 0.5 N aqueous solution of sodium hydroxide was 2.8 mmol/g, 30 g of ethanol was added to the diluted solution to stop the reaction.

0.5 N Hydrochloric acid was added to the diluted solution to decrease the pH of the diluted solution to 2.

The diluted solution was filtered to recover the pulp, and the pulp was repeatedly washed with 0.01 N hydrochloric acid or water to obtain oxidized pulp.

Conductivity titration of the oxidized pulp was carried out with a 0.1 N sodium hydroxide aqueous solution using an automatic titration device (trade name: AUT-701, manufactured by DKK-TOA Corporation), and the amount of carboxyl groups of 1.6 mmol/g was calculated.

The obtained oxidized pulp was diluted with water and a pH thereof was adjusted to 9 with a 0.5 N aqueous sodium hydroxide solution so that an oxidized pulp 1.5% suspension was obtained.

This suspension was dispersed for 2 hours with a rotary blade type mixer to obtain a dispersion liquid of colorless transparent cellulose nanofibers.

Evaluation of Manufacturing Examples 1 and 2

Average fiber diameters of the cellulose nanofibers contained in the dispersion liquids obtained in Manufacturing Examples 1 and 2 were measured.

Each dispersion liquid was diluted to a concentration of 0.001%, applied on mica, and a fiber form therein was observed with an atomic force microscope (AFM). An average of widths of any 10 fibers existing one by one was obtained and taken as the average fiber diameter.

As a result, the average fiber diameter of the cellulose nanofibers of Manufacturing Example 1 was 1,800 nm, and the average fiber diameter of the cellulose nanofibers of Manufacturing Example 2 was 4 nm.

Manufacturing Examples 3 and 4

Polyvinyl alcohol (trade name: PVA 124, manufactured by Kuraray Co., Ltd.) was dissolved in water to prepare a 4% by mass aqueous solution of polyvinyl alcohol.

This polyvinyl alcohol aqueous solution was mixed with each of the dispersion liquids of the cellulose nanofibers prepared in Manufacturing Examples 1 and 2 to prepare dispersion liquids having a solid content mass ratio of cellulose nanofibers/polyvinyl alcohol=30/70.

Examples 1 to 4

On an acid-resistant cup raw paper having a basis weight of 260 g/m$^2$, each of the dispersion liquids of Manufacturing Examples 1 to 4 was coated using a bar coater so as to be a coating amount (dry mass) of 1 g/m$^2$, and a coating film was formed thereon. Then, the acid-resistant cup raw paper was dried in an oven at 120° C. for 5 minutes to obtain laminates 1 to 4 in which a reinforcing layer was formed on the acid-resistant cup raw paper.

Next, an imine-based adhesive was applied as an anchor coat layer on both sides of each of the laminates 1 to 4, and then a sealant layer of 30 μm in thickness formed of a linear low density polyethylene resin was formed by a melt extrusion lamination method, to obtain barrier papers 1 to 4.

Next, each of the barrier papers 1 to 4 was punched out using a punching die to produce a body portion material and a bottom portion material.

Next, the body portion material and the bottom portion material were molded with a cup molding machine to obtain paper cups (capacity of 250 mL) of Examples 1 to 4.

Comparative Example 1

On both sides of an acid-resistant cup raw paper having a basis weight of 260 g/m$^2$, an imine-based adhesive was applied as an anchor coat layer, and then a sealant layer of 30 μm in thickness formed of a linear low density polyethylene resin was formed by a melt extrusion lamination method, to obtain a laminate formed of the acid-resistant cup raw paper and the sealant layer.

Using the obtained laminate, a paper cup of Comparative Example 1 was obtained in the same manner as in Examples 1 to 4.

Comparative Example 2

Polyvinyl alcohol (trade name: PVA 124, manufactured by Kuraray Co., Ltd.) was dissolved in water to prepare a 4% by mass aqueous solution of polyvinyl alcohol.

This polyvinyl alcohol aqueous solution was coated on an acid-resistant cup raw paper having a basis weight of 260 g/m$^2$ using a bar coater so as to be a coating amount of 1 g/m$^2$, and a coating film was formed thereon. Then, the acid-resistant cup raw paper was dried in an oven at 120° C. for 5 minutes to obtain a laminate having a reinforcing layer formed on the acid-resistant cup raw paper.

Next, on both sides of the laminate, an imine-based adhesive was applied as an anchor coat layer, and then a sealant layer of 30 μm in thickness formed of a linear low density polyethylene resin was formed by a melt extrusion lamination method.

Using the obtained laminate, a paper cup of Comparative Example 2 was obtained in the same manner as in Examples 1 to 4.

Comparative Example 3

Carboxymethyl cellulose (trade name: F350HC-4, manufactured by Nippon Paper Industries Co., Ltd.) was dissolved in water to prepare a 1% by mass aqueous solution of carboxymethyl cellulose.

This carboxymethyl cellulose aqueous solution was coated on an acid-resistant cup raw paper having a basis weight of 260 g/m$^2$ using a bar coater so as to be a coating amount of 1 g/m$^2$, and a coating film was formed thereon. Then, the acid-resistant cup raw paper was dried in an oven at 120° C. for 5 minutes to obtain a laminate having a reinforcing layer formed on the acid-resistant cup raw paper.

Next, on both sides of the laminate, an imine-based adhesive was applied as an anchor coat layer, and then a sealant layer of 30 μm in thickness formed of a linear low density polyethylene resin was formed by a melt extrusion lamination method.

Using the obtained laminate, a paper cup of Comparative Example 3 was obtained in the same manner as in Examples 1 to 4.

Comparative Example 4

Polyvinyl alcohol (trade name: PVA 124, manufactured by Kuraray Co., Ltd.) was dissolved in water to prepare a 4% by mass aqueous solution of polyvinyl alcohol.

This polyvinyl alcohol aqueous solution and the dispersion liquid of the cellulose nanofibers prepared in Manufacturing Example 3 were mixed to prepare a dispersion liquid having a solid content mass ratio of cellulose nanofibers/polyvinyl alcohol=10/90.

This carboxymethyl cellulose aqueous solution was coated on an acid-resistant cup raw paper having a basis weight of 260 g/m² using bar coater so as to be a coating amount of 1 g/m², and a coating film was formed thereon. Then, the acid-resistant cup raw paper was dried in an oven at 120° C. for 5 minutes to obtain a laminate having a reinforcing layer formed on the acid-resistant cup raw paper.

Next, on both sides of the laminate, an imine-based adhesive was applied as an anchor coat layer, and then a sealant layer of 30 μm in thickness formed of a linear low density polyethylene resin was formed by a melt extrusion lamination method.

Using the obtained laminate, a paper cup of Comparative Example 4 was obtained in the same manner as in Examples 1 to 4.

[Evaluation]

For each of the paper cups of Examples 1 to 4 and Comparative Examples 1 to 4, a buckling strength and a lateral pressing strength were measured (1) before a falling test, (2) after a free-fall was performed 5 times from a height of 1 m towards a concrete floor surface with a bottom portion being downward, (3) after the cup was filled with 200 mL of pure water (pH 6.8), one hour later, discharge was performed, and then a free-fall was performed 5 times from a height of 1 m towards a concrete floor surface with a bottom portion being downward, and (4) after the cup was filled with 200 mL of a 0.1% citric acid aqueous solution (pH 3.8), one hour later, discharge was performed, and then a free-fall was performed 5 times from a height of 1 m towards a concrete floor surface with a bottom portion being disposed downward. The buckling strength was measured by performing compression at a compression rate of 10 mm/min using a Tensilon RTC-1250 (manufactured by Orientec Co., Ltd.). The lateral pressing strength was measured using a digital force gauge ZTA-DPU-10N (manufactured by Imada Co., Ltd.).

Measurement of the lateral pressing strength was carried out, as described above, under a condition that the body portion is pressed by 10 mm at a ⅔ height (a position shifted in phase in a circumferential direction by 180° with respect to a bonded portion), from the bottom, of the entire height of the paper cup. The results are shown in Table 1.

TABLE 1

| | CELLULOSE NANOFIBERS | | (1) | (2) | (3) | (4) |
|---|---|---|---|---|---|---|
| EXAMPLE 1 | MANUFACTURING EXAMPLE 1 | BUCKLING STRENGTH (N) | 450 | 440 | 380 | 390 |
| | | LATERAL PRESSING STRENGTH (N) | 5.1 | 4.9 | 4.5 | 4.5 |
| EXAMPLE 2 | MANUFACTURING EXAMPLE 2 | BUCKLING STRENGTH (N) | 460 | 440 | 430 | 445 |
| | | LATERAL PRESSING STRENGTH (N) | 5.0 | 4.9 | 4.6 | 4.9 |
| EXAMPLE 3 | MANUFACTURING EXAMPLE 3 | BUCKLING STRENGTH (N) | 445 | 430 | 380 | 390 |
| | | LATERAL PRESSING STRENGTH (N) | 5.8 | 4.7 | 4.2 | 4.2 |
| EXAMPLE 4 | MANUFACTURING EXAMPLE 4 | BUCKLING STRENGTH (N) | 450 | 450 | 420 | 430 |
| | | LATERAL PRESSING STRENGTH (N) | 5.7 | 4.6 | 4.6 | 4.2 |
| COMPARATIVE EXAMPLE 1 | — | BUCKLING STRENGTH (N) | 390 | 315 | 310 | 300 |
| | | LATERAL PRESSING STRENGTH (N) | 4.7 | 3.6 | 3.5 | 3.4 |
| COMPARATIVE EXAMPLE 2 | — | BUCKLING STRENGTH (N) | 420 | 340 | 300 | 310 |
| | | LATERAL PRESSING STRENGTH (N) | 4.9 | 3.7 | 3.5 | 3.5 |
| COMPARATIVE EXAMPLE 3 | — | BUCKLING STRENGTH (N) | 430 | 330 | 270 | 280 |
| | | LATERAL PRESSING STRENGTH (N) | 4.9 | 3.1 | 3.4 | 3.4 |
| COMPARATIVE EXAMPLE 4 | — | BUCKLING STRENGTH (N) | 420 | 340 | 310 | 320 |
| | | LATERAL PRESSING STRENGTH (N) | 4.9 | 3.1 | 3.5 | 3.5 |

From the results shown in Table 1, it has been found that the paper cups of Examples 1 to 4 are paper cups which have higher buckling strength and lateral pressing strength, and an excellent strength, as compared with the paper cups of Comparative Examples 1 to 4 in all states of (1) to (4). In particular, the paper cup of Example 2 showed little decrease in strength after being filled with acidic contents and showed a slightly increased buckling strength. In all Examples, a reinforcing effect suitable for acid contents was obtained.

INDUSTRIAL APPLICABILITY

Due to an excellent mechanical strength, the paper cup of the present invention can be applied to various fields such as containers and packaging materials for foods, toiletry products, chemicals, medical products, electronic members, and the like.

What is claimed is:

1. A paper cup comprising bather paper, the paper cup having a bottom portion and a body portion which are formed of the barrier paper, the bather paper including at least a paper base material, a reinforcing layer containing cellulose nanofibers which is formed on the paper base material, and a sealant layer formed on the reinforcing layer, wherein after the paper cup is caused to free-fall 5 times towards a concrete floor surface from a height of 1 m with the bottom portion being disposed downward, the paper cup has a buckling strength of 350 N or more in a case of being sandwiched between two parallel plate surfaces and compressed in a height direction of the body portion, and has a lateral pressing strength of 4 N or more in a case where the body portion is pressed by 10 mm at a ⅔ height, from a bottom, of the entire height of the paper cup.

2. The paper cup according to claim 1, wherein the paper base material has a basis weight of 300 g/m² or less.

3. The paper cup according to claim 1,
wherein a coating amount of the reinforcing layer is 0.2 g/m² to 5.0 g/m² in terms of dry mass.

4. The paper cup according to claim 1,
wherein an amount of the cellulose nanofibers in the reinforcing layer is 20% by mass or more.

5. The paper cup according to claim 1,
wherein the cellulose nanofibers are obtained by fibrillating a natural cellulose material.

6. The paper cup according to claim 1,
wherein the cellulose nanofibers have an average fiber diameter of 2 nm to 2,000 nm.

7. The paper cup according to claim 1,
wherein the reinforcing layer further contains a water-soluble polymer.

8. A paper cup for acidic food, comprising:
the paper cup according to claim 1,
wherein the paper cup has an improved mechanical strength by accommodating liquid or semi-solid contents having a pH of 6 or less.

\* \* \* \* \*

UNITED STATES PATENT AND TRADEMARK OFFICE
CERTIFICATE OF CORRECTION

PATENT NO. : 10,358,253 B2
APPLICATION NO. : 16/156211
DATED : July 23, 2019
INVENTOR(S) : Akiko Saiki et al.

Page 1 of 1

It is certified that error appears in the above-identified patent and that said Letters Patent is hereby corrected as shown below:

In the Claims

Column 16, Line 49, In Claim 1, delete "bather" and insert -- barrier --, therefor.

Column 16, Line 51, In Claim 1, delete "bather" and insert -- barrier --, therefor.

Signed and Sealed this
Tenth Day of September, 2019

Andrei Iancu
*Director of the United States Patent and Trademark Office*